Patented Feb. 10, 1953

2,628,243

UNITED STATES PATENT OFFICE 2,628,243

PREPARATION OF ORGANOCHLOROSILANES

Arthur J. Barry and John W. Gilkey, Midland, Mich., assignors to Dow Corning Corporation, Midland, Mich., a corporation of Michigan No Drawing. Application October 14, 1950, Serial No. 190,253. In Great Britain January 9, 1950

7 Claims. (Cl. 260—448.2)

This invention relates to the manufacture of organochlorosilanes.

The most widely employed chlorosilanes in use at present are methyltrichlorosilane and dimethyldichlorosilane. There have been various processes employed for the production of these compounds. The two chief methods are that of reacting methylchloride with silicon, and reacting methyl Grignard reagent with silicon tetrachloride. Both of these processes have certain manufacturing drawbacks, due to losses incurred during the reaction.

Vinylsiliconchlorides and allylsiliconchlorides heretofore have been prepared with difficulty. The Grignard reaction does not produce satisfactory yields of these materials and neither does the reaction of vinylchloride with silicon.

It is the object of this invention to provide an economically feasible method for preparing methylchlorosilanes, vinylchlorosilanes, and allylchlorosilanes, which method employs relatively cheap starting materials.

In accordance with this invention a chlorosilane of the formula $R(CH_3)_nSiCl_{3-n}$ where R is an alkyl radical of at least 2 carbon atoms or a cycloalkyl radical, and $n$ is 0 to 1, is pyrolytically cracked by heating it at a temperature of at least 350° C.

The chlorosilanes which are operative in this invention are those in which the R group is an alkyl or cycloalkyl radical of at least 2 carbon atoms. The alkyl radicals may be primary or secondary alkyl and it is preferred that the radical contain at least one carbon atom in the gamma position with respect to the silicon. Thus, the preferred alkyl radicals are propyl or higher.

Specific examples of chlorosilanes which are operative and which are within the purview of this invention are:

Propyltrichlorosilane
Ethyltrichlorosilane
Octadecyltrichlorosilane
Ethylmethyldichlorosilane
Butylmethyldichlorosilane
Octadecylmethyldichlorosilane
Amylmethyldichlorosilane
Isobutyltrichlorosilane
Hexyltrichlorosilane
Cyclohexyltrichlorosilane
Propylmethyldichlorosilane
Hexylmethyldichlorosilane
Sec-butylmethyldichlorosilane The above silanes are pyrolytically cracked by heating them at a temperature of at least 350° C. The process may be conducted either in the vapor or liquid state. When the reaction is carried out in the vapor state the preferred temperature range is from 540° to 820° C. with optimum yields being obtained in the range 600° to 700° C. Under these conditions the higher alkyl radicals crack to give methyl radicals, hydrogen, and unsaturated hydrocarbons. Thus, for example, propyltrichlorosilane yields methyltrichlorosilane, whereas propylmethyldichlorosilane yields dimethyldichlorosilane.

If desired, the cracking may be carried out in the presence of a catalyst such as a synthetic mixture of 10 per cent aluminum oxide and 90 per cent $SiO_2$. The presence of a catalyst increases the speed of the reaction, thereby increasing the yield of methylchlorosilane for any given time.

It has been found that when the process is carried out in vapor phase that in addition to methylchlorosilane, vinyl and allylchlorosilanes are also obtained. These are desirable by-products, and this method offers a convenient commercial way of preparing such compounds. These unsaturates result from dehydrogenation during the cracking process. In the vapor phase reactions the products do not long remain in the reaction zone. Hence, there is relatively little chance of hydrogenation taking place.

When the cracking is carried out in the liquid phase the reaction is best carried out at temperatures from 350° C. to 540° C. The system is under autogenous pressure. Under such conditions methylchlorosilanes are obtained, but little if any unsaturated chlorosilanes. This is due, presumably, to the hydrogenation of any unsaturates which might be momentarily present during the reaction. Thus, some ethylchlorosilanes are obtained but no vinyl. In the liquid phase reaction the pressure is not critical.

When the reactants are subjected to the temperatures shown above, cracking commences immediately although the yield of the cracked product will increase with increasing time of reaction. The process lends itself readily to continuous operation since the uncracked chlorosilanes may be recycled.

The instant method offers a particularly feasible method of preparing methyltrichlorosilane, dimethyldichlorosilane, vinylchlorosilane, vinylmethyldichlorosilane, allylmethyldichlorosilane, and allyltrichlorosilane. The method is particularly useful because of the low yields of undesirable by-products.

The following examples are illustrative only and should not be construed as limiting the invention, which is particularly set forth in the appended claims.

Example 1

Propyltrichlorosilane was cracked by placing 3195 grams thereof in a 14.4 liter autoclave. The autoclave was heated to 450° C. Upon attaining this temperature, the pressure had risen to 915 lbs. per square inch. It was maintained at 450° C. for fifteen and one-half hours, at which time the pressure was 1300 lbs. per square inch. The autoclave was then cooled and the contents discharged and distilled, whereby methyltrichlorosilane was obtained as a distilled product.

Example 2

Ethyltrichlorosilane was cracked by placing 2940 grams thereof in the autoclave employed in Example 1 and heating it to 450° C. The initial pressure was 920 lbs. per square inch, and the final pressure was 950 lbs. per square inch after seventeen hours. Upon cooling, discharging the product, and upon distillation, methyltrichlorosilane was obtained.

Example 3

Butylmethyldichlorosilane was cracked. The butylmethyldichlorosilane which was employed was a mixture of primary and secondary butylmethyldichlorosilane and isobutylmethyldichlorosilane. 3078 grams of this mixture were charged to the autoclave employed in Example 1 and heated at 450° C. for five hours. The initial pressure was 900 lbs. per square inch, and the final pressure 1510 lbs. per square inch. The product was removed and distilled, whereby there was obtained dimethyldichlorosilane as a distilled product.

Example 4

523 grams of propylmethyldichlorosilane was passed through a quartz tube packed with clay plates at the rate of 3.6 cc. per minute and at a temperature of 660° C. The effluent gases were passed through a water condenser where 387 grams of product collected. This material was distilled and there was obtained dimethyldichlorosilane and vinylmethyldichlorosilane, together with uncracked propylmethyldichlorosilane.

Example 5

1240 grams of a mixture of n-butyltrichlorosilane, sec-butyltrichlorosilane, and isobutyltrichlorosilane were passed through a quartz tube packed with clay plates at a rate of 2.9 cc. per minute at a temperature of 650° C. The effluent gases were passed through a water condenser where 991 grams product collected. Upon distillation of this material methyltrichlorosilane, vinyltrichlorosilane, and allyltrichlorosilane were obtained.

Example 6

546 grams of cyclohexyltrichlorosilane was heated in a bomb 12 hours at 450° C. The bomb was cooled and upon distillation of the product methyltrichlorosilane was obtained.

Example 7

A quartz tube was packed with a silica-alumina catalyst having the composition 90 per cent $SiO_2$ and 10 per cent alumina. 1281 grams of n-hexylmethyldichlorosilane was passed through this tube at a rate of 3.2 cc. per minute at a temperature of 570° C. 1032 grams of product collected in the water trap. Upon distillation of this material, dimethyldichlorosilane, vinylmethyldichlorosilane, together with higher unsaturated aliphatic methyldichlorosilanes such as allylmethyldichlorosilanes, were obtained.

That which is claimed is:

1. The method which comprises heating a chlorosilane of the formula $R(CH_3)_nSiCl_{3-n}$ where R is an alkyl radical of at least 2 carbon atoms, and $n$ has a value from 0 to 1, at a temperature of from 350° C. to 800° C., whereby lower aliphatic chlorosilanes are produced.

2. The method of preparing methylchlorosilanes which comprises heating chlorosilanes of the formula $R(CH_3)_nSiCl_{3-n}$ where R is an alkyl radical of at least two carbon atoms, and $n$ has a value from 0 to 1, in liquid phase under autogenous pressure at a temperature of from 350° to 540° C.

3. The process in accordance with claim 2 wherein the R group is propyl.

4. The process in accordance with claim 2 wherein the R group is butyl.

5. The method which comprises heating a chlorosilane of the formula $R(CH_3)_nSiCl_{3-n}$ where R is an alkyl radical of at least 2 carbon atoms, and $n$ has a value from 0 to 1 in vapor phase at a temperature from 540° to 800° C., whereby lower aliphatic chlorosilanes are obtained.

6. The process in accordance with claim 5 wherein the R group is propyl.

7. The process in accordance with claim 5 wherein the R group is butyl.

ARTHUR J. BARRY.
JOHN W. GILKEY.

REFERENCES CITED

The following references are of record in the file of this patent:

UNITED STATES PATENTS

| Number | Name | Date |
|---|---|---|
| 2,379,821 | Miller | July 3, 1945 |
| 2,405,019 | Dalin | July 30, 1946 |
| 2,532,387 | Bailey | Dec. 5, 1950 |